(12) United States Patent
Bampis et al.

(10) Patent No.: US 12,739,416 B2
(45) Date of Patent: Sep. 15, 2026

(54) TECHNIQUES FOR JOINTLY TRAINING A DOWNSCALER AND AN UPSCALER FOR VIDEO STREAMING

(71) Applicant: NETFLIX, INC., Los Gatos, CA (US)

(72) Inventors: Christos G. Bampis, Los Gatos, CA (US); Zhi Li, Mountain View, CA (US)

(73) Assignee: NETFLIX, INC., Los Gatos, CA (US)

( * ) Notice: Subject to any disclaimer, the term of this patent is extended or adjusted under 35 U.S.C. 154(b) by 571 days.

(21) Appl. No.: 17/981,281

(22) Filed: Nov. 4, 2022

(65) Prior Publication Data

US 2023/0144735 A1 May 11, 2023

Related U.S. Application Data

(60) Provisional application No. 63/277,545, filed on Nov. 9, 2021.

(51) Int. Cl.
*H04N 19/436* (2014.01)
*G06T 3/4046* (2024.01)
*H04N 19/30* (2014.01)

(52) U.S. Cl.
CPC ......... *H04N 19/436* (2014.11); *G06T 3/4046* (2013.01); *H04N 19/30* (2014.11)

(58) Field of Classification Search
CPC ...... H04N 19/436; H04N 19/30; H04N 19/59; G06T 3/4046; G06T 3/4053
USPC .......................................................... 382/157
See application file for complete search history.

(56) References Cited

U.S. PATENT DOCUMENTS

| | | | | |
|---|---|---|---|---|
| 2019/0075301 | A1 | 3/2019 | Chou et al. | |
| 2020/0053408 | A1* | 2/2020 | Park | G06T 3/4046 |
| 2020/0162789 | A1* | 5/2020 | Ma | H04N 21/440263 |
| 2020/0177898 | A1* | 6/2020 | Park | H04N 19/50 |
| 2021/0021823 | A1* | 1/2021 | Na | H04N 19/124 |
| 2021/0049739 | A1* | 2/2021 | Schroers | G06T 3/4046 |

(Continued)

OTHER PUBLICATIONS

Deep Video Precoding, Eirina Bourtsoulatze, Aaron Chadha, Ilya Fadeev, Vasileios Giotsas, Yiannis Andreopoulos, Pub: IEEE Transactions on Circuits and Systems for Video Technology (vol. 30, Issue: 12, 2020, pp. 4913-4928) Dec. 1, 2020 (Year: 2020).*

(Continued)

*Primary Examiner* — Jennifer Mehmood
*Assistant Examiner* — Heath E. Wells
(74) *Attorney, Agent, or Firm* — Artegis Law Group, LLP

(57) ABSTRACT

In various embodiments a training application trains convolutional neural networks (CNNs) to reduce reconstruction errors. The training application executes a first CNN on a source image having a first resolution to generate a downscaled image having a second resolution. The training application executes a second CNN on the downscaled image to generate a reconstructed image having the first resolution. The training application computes a reconstruction error based on the reconstructed image and the source image. The training application updates a first learnable parameter value included in the first CNN based on the reconstruction error to generate at least a partially trained downscaling CNN. The training application updates a second learnable parameter included in the second CNN based on the reconstruction error to generate at least a partially trained upscaling CNN.

20 Claims, 4 Drawing Sheets

(56) References Cited

U.S. PATENT DOCUMENTS

2022/0180568 A1* 6/2022 Cho .......................... G06N 3/09
2023/0144735 A1 5/2023 Bampis et al.

OTHER PUBLICATIONS

Non Final Office Action received for U.S. Appl. No. 17/981,292 dated May 9, 2024, 16 pages.
Final Office Action received for U.S. Appl. No. 17/981,292 dated Nov. 6, 2024, 12 pages.
Chen et al., "A Progressive Architecture for Learned Fractional Downsampling", IEEE, DOI: 10.1109/PCS50896.2021.9477407, Jun. 29, 2021, pp. 1-5.
International Search Report for Application No. PCT/US2022/079500 dated Feb. 17, 2023.
Non Final Office Action received for U.S. Appl. No. 17/981,292 dated Mar. 26, 2025, 13 pages.
Notice of Allowance received for U.S. Appl. No. 17/981,292 dated Jul. 18, 2025, 12 pages.

* cited by examiner

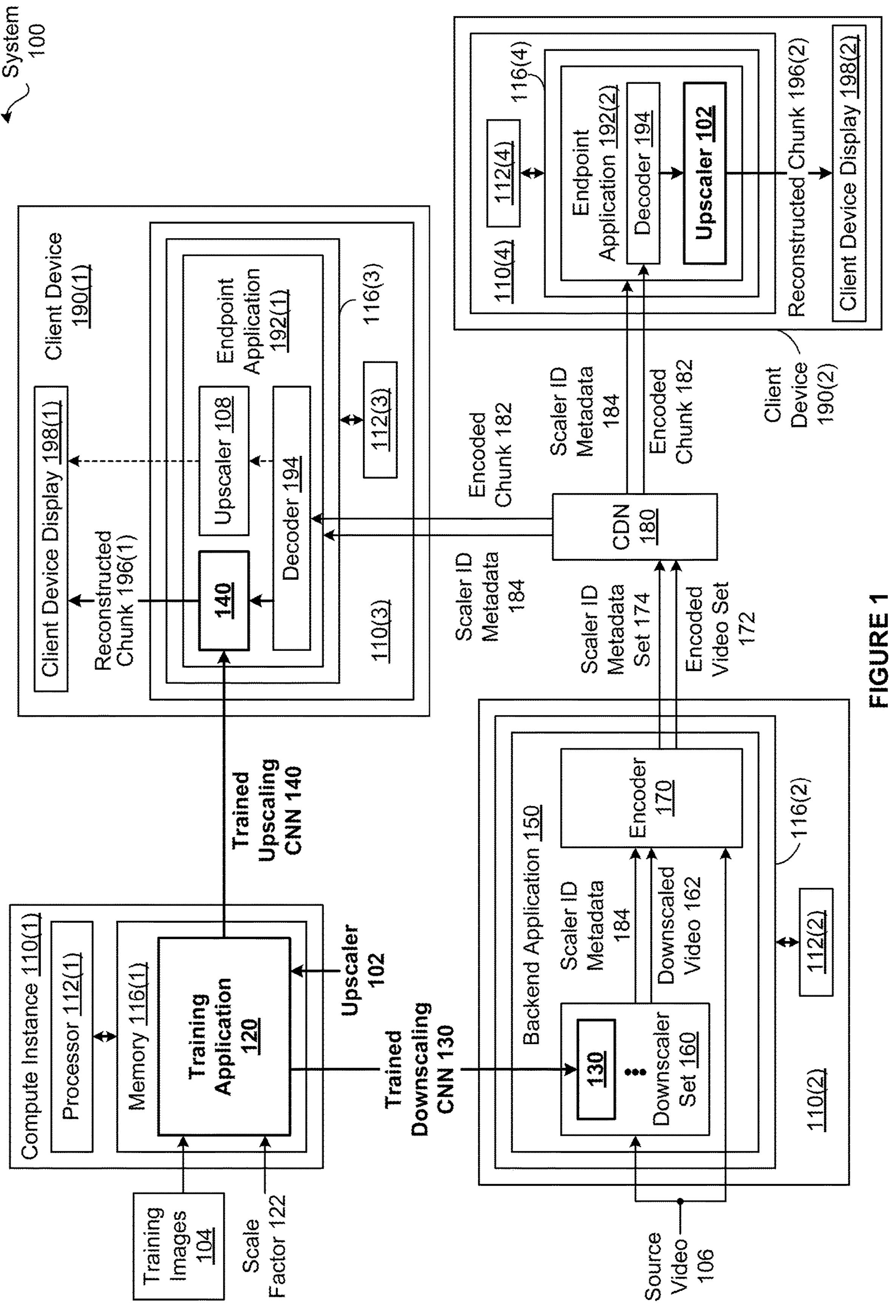
System 100
Compute Instance 110(1)
Processor 112(1)
Memory 116(1)
Training Application 120
Training Images 104
Scale Factor 122
Upscaler 102
Trained Upscaling CNN 140
Trained Downscaling CNN 130
Client Device 190(1)
Client Device Display 198(1)
Reconstructed Chunk 196(1)
140
Upscaler 108
Decoder 194
Endpoint Application 192(1)
116(3)
112(3)
110(3)
Scaler ID Metadata 184
Encoded Chunk 182
CDN 180
Scaler ID Metadata Set 174
Encoded Video Set 172
Backend Application 150
130
Downscaler Set 160
Scaler ID Metadata 184
Downscaled Video 162
Encoder 170
116(2)
112(2)
110(2)
Source Video 106
110(4)
112(4)
116(4)
Endpoint Application 192(2)
Decoder 194
Upscaler 102
Reconstructed Chunk 196(2)
Client Device Display 198(2)
Client Device 190(2)
FIGURE 1

300

Generate a downscaling CNN and an upscaling CNN based on a scale factor
302

Generate a training network that includes the downscaling CNN, the upscaling CNN, and zero or more training upscalers that implement the scale factor
304

Extract image patches from training images, distribute the image patches across any number of batch(es), and select the first batch
306

For each image patch in the selected batch, execute the downscaling CNN on the image patch to generate a corresponding downscaled patch
308

For each image patch in the selected batch, independently execute the upscaling CNN and each training upscaler on the corresponding downscaled patch to generate corresponding reconstructed patch(es)
310

For each image patch in the selected batch, compute corresponding loss(es) based on the image patch and the corresponding reconstructed patch(es)
312

Compute an iteration loss based on the loss(es) corresponding to the image patch(es) in the selected batch and then update learnable parameters of both the upscaling CNN and the downscaling CNN based on the iteration loss
314

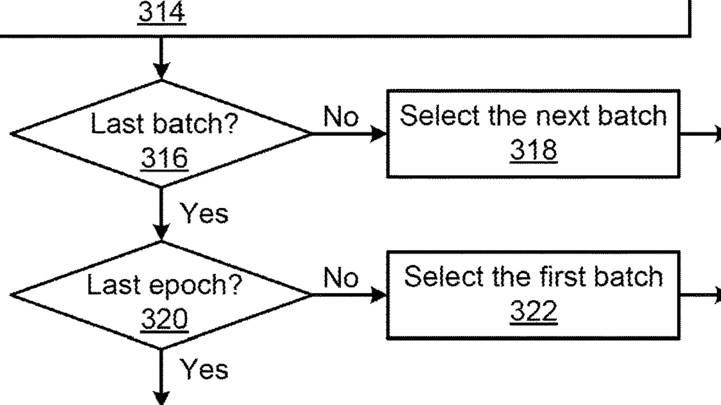

Store the downscaling CNN as a trained downscaling CNN associated with the scale factor, store the upscaling CNN as a trained downscaling CNN associated with the scale factor, transmit the trained downscaling CNN to a backend application, and transmit the trained upscaling CNN to any number of endpoint applications
324

FIGURE 3

TECHNIQUES FOR JOINTLY TRAINING A DOWNSCALER AND AN UPSCALER FOR VIDEO STREAMING

CROSS-REFERENCE TO RELATED APPLICATIONS

This application claims priority benefit of the U.S. Provisional Patent Application titled, "Techniques for Joint Optimization of Video Downscaling and Upscaling for Streaming Applications," filed on Nov. 9, 2021 and having Ser. No. 63/277,545. The subject matter of this related application is hereby incorporated herein by reference.

BACKGROUND

Field of the Various Embodiments

The various embodiments relate generally to computer science and to video streaming technology and, more specifically, to techniques for jointly training a downscaler and an upscaler for video streaming.

Description of the Related Art

In a typical video streaming system, a video streaming service provides users with access to a library of media titles that can be viewed on a wide range of different client devices. In operation, a given client device connects to the video streaming service under a host of varying connection conditions and, therefore, can be susceptible to varying available network bandwidths. To enable a media title to be streamed to a client device without playback interruptions, irrespective of the available network bandwidth, multiple different encodings of the media title are provided to the client device, where "lower-quality" encodings usually are streamed to the client device when the available network bandwidth is relatively low, and "higher-quality" encodings usually are streamed to the client device when the available network bandwidth is relatively high.

To generate the different encodings of a given media title, the video streaming service typically encodes the media title multiple times via a video encoding pipeline. The video encoding pipeline eliminates different amounts of information from a source video associated with a given media title to generate multiple encoded videos, where each encoded video is associated with a different bitrate. In practice, a downscaler in a typical encoding pipeline downscales the source video to multiple lower resolutions. An encoder in the encoding pipeline then compresses the source video and each of the downscaled lower-resolution videos to different degrees to generate the different encoded videos. An encoded video associated with a given bitrate can be streamed to a client device without playback interruptions when the available network bandwidth is greater than or equal to that particular bitrate.

To playback a given media title on a client device, an endpoint application can be implemented on the client device. The endpoint application is configured to select the different encoded videos generated for the media title based on the available network bandwidth. When a given encoded video is selected by the endpoint application, one or more discrete portions or "chunks" of the selected encoded video are streamed to the client device for playback. Upon receiving a chunk of a selected encoded video, the endpoint application executes a decoder on the chunk to generate a chunk of decoded video. If the decoded video has the same resolution as the client device display, then the chunk of decoded video is deemed a chunk of reconstructed video that is ready for playback. Otherwise, the endpoint application executes one or more upscalers on the chunk of decoded video to generate the chunk of reconstructed video having the same resolution as the client device display. To effect the playback of the media title on the client device, the endpoint application plays back the different chunks of reconstructed video.

As alluded to above, the downscalers and encoders included in most video encoding pipelines eliminate information from the source video for a media title when generating the different video encodings for the media title. Thus, as a general matter, the visual quality of a given chunk of reconstructed video is usually lower than the visual quality of the corresponding chunk of source video used to generate that chunk of reconstructed video, which usually means that the chunk of reconstructed video contains relatively more visual quality impairments or artifacts. Further, as a general matter, the visual quality of a chunk of reconstructed video typically decreases as the bitrate associated with the corresponding chunk of encoded video decreases.

In one approach to limiting the diminution in visual quality of reconstructed videos when downscaling, machine learning techniques are used to generate trained downscalers. Each trained downscaler is normally associated with a different fixed scale factor and is trained to reduce end-to-end reconstruction errors when implemented in conjunction with a general-purpose upscaler or upscaling algorithm that is configured to upscale images or frames of decoded videos by a variable scaling parameter. During training, a downscaler that has multiple learnable parameters maps source images to downscaled images having resolutions that are lower than the resolutions of corresponding source images by an associated scale factor. The general-purpose upscaler is then executed on the downscaled images using the associated scale factor to generate reconstructed images having the same resolution as the corresponding source images. Notably, during training, values of the learnable parameters in the downscaler are updated to reduce reconstruction errors that correlate to end-to-end losses of visual quality between the source images and the corresponding reconstructed images.

One drawback of the above technique is that client devices typically implement general-purpose upscalers that are designed to operate robustly across many different types of digital signals. Those general-purpose upscalers typically are not tailored for a particular type of digital signal. Consequently, a general-purpose upscaler is not able to minimize the end-to-end loss of visual quality of a reconstructed video attributable to downscaling by a trained downscaler. As a result, for a given encoding bitrate, the overall visual quality of reconstructed videos generated using a trained downscaler in combination with a general-purpose upscaler can be sub-optimally low. Conversely, in these types of implementations, the total number of bits used to encode a source video to achieve a given target visual quality level for an associated reconstructed video can be unnecessarily high.

Another drawback of the above technique is that some of the client devices included in a typical video streaming system usually implement general-purpose upscalers and/or trained upscalers that are not well represented by the general-purpose upscalers typically used to train the trained downscalers. As a result, the upscalers oftentimes implemented by client devices can lack interoperability with the trained downscalers. If an upscaler lacks interoperability with a trained downscaler used to generate an encoded video, then, during operation, the upscaler can inadvertently insert artifacts (such as "halo effects" that result in "flickering" during playback) into a corresponding reconstructed video, thereby reducing the overall visual quality of the reconstructed video.

As the foregoing illustrates, what is needed in the art are more effective techniques for scaling videos within a video streaming system.

SUMMARY

One embodiment sets forth a method for training convolutional neural networks (CNNs) to reduce reconstruction errors. The method includes executing a first CNN on a first source image having a first resolution to generate a first downscaled image having a second resolution; executing a second CNN on the first downscaled image to generate a first reconstructed image having the first resolution; computing a first reconstruction error based on the first reconstructed image and the first source image; updating a first learnable parameter value included in the first CNN based on the first reconstruction error to generate at least a partially trained downscaling CNN; and updating a second learnable parameter value included in the second CNN based on the first reconstruction error to generate at least a partially trained upscaling CNN.

At least one technical advantage of the disclosed techniques relative to the prior art is that a trained downscaling convolutional neural network (CNN) and a corresponding trained upscaling CNN can be implemented in combination with one another within a video encoding system to more effectively limit the diminution in visual quality of reconstructed videos when performing scaling operations. Unlike prior art techniques, the trained downscaling CNN and the corresponding trained upscaling CNN are jointly trained to cooperatively reduce reconstruction errors attributable to scaling operations. Further, with the disclosed techniques, an endpoint application can identify, via metadata, the trained downscaling CNN used to generate an encoded video. The endpoint application can then identify and use the corresponding trained upscaling CNN to generate a corresponding reconstructed video that has an increased visual quality level for a given bitrate relative to what can typically be achieved using prior art techniques. Conversely, the disclosed techniques enable the number of bits used when encoding a source video to achieve a given target visual quality to be reduced relative to what is typically required using prior art techniques. Another technical advantage of the disclosed techniques is that a trained downscaling CNN can be trained to reduce reconstruction errors oftentimes associated with performing upscaling operation using trained downscaling CNNs in combination with different types of upscalers. Thus, with the disclosed techniques, interoperability between trained downscaling CNNs and different types of upscalers can be increased relative to prior art techniques, which allows the visual quality of reconstructed videos to be increased across a wide range of different client devices. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 1 is a conceptual illustration of a system configured to implement one or more aspects of the various embodiments;

FIG. 3 is a flow diagram of method steps for jointly training a downscaling CNN and an upscaling CNN, according to various embodiments.

DETAILED DESCRIPTION

Figure 2:
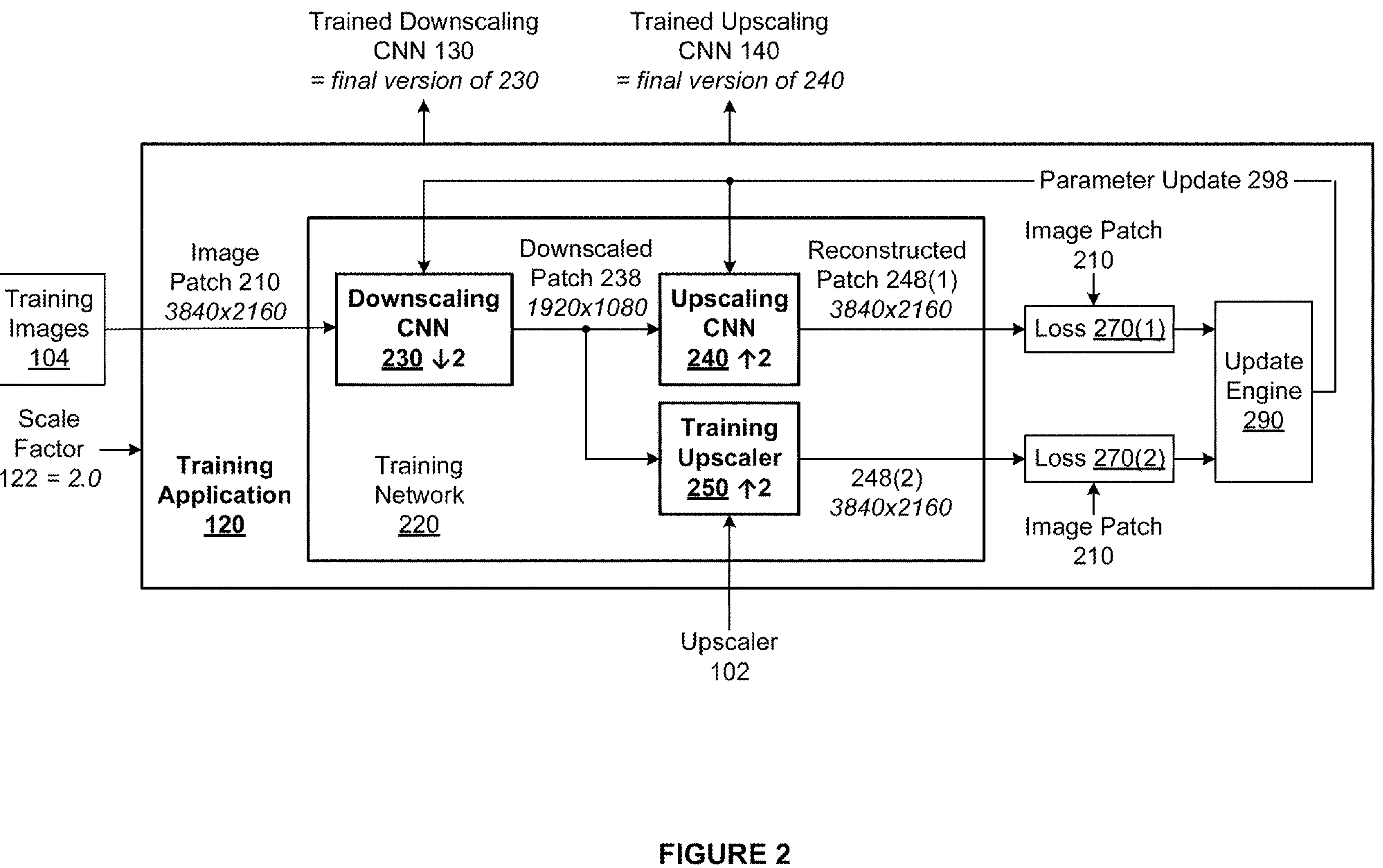
FIG. 2 is a more detailed illustration of the training application of FIG. 1, according to various embodiments.

In the following description, numerous specific details are set forth to provide a more thorough understanding of the various embodiments. However, it will be apparent to one skilled in the art that the inventive concepts may be practiced without one or more of these specific details.

To enable a media title to be streamed to any number of client devices without playback interruptions, a typical video streaming service pre-generates multiple different encoded videos based on an associated source video. To generate the different encoded videos for a given media title, a video streaming service typically encodes the media title multiple times via a video encoding pipeline. The video encoding pipeline eliminates different amounts of information from a source video to generate multiple encoded videos, where each encoded video is associated with a different bitrate. In practice, a typical encoding pipeline downscales the source video to multiple lower resolutions and then encodes the source video and each of the downscaled lower-resolution videos to different degrees to generate the different encoded videos. An encoded video associated with a given bitrate can be streamed to a client device without playback interruptions when the available network bandwidth is greater than or equal to that bitrate.

To playback a given media title on a client device, an endpoint application executing on the client device selects discrete portions or "chunks" of the different encoded videos generated for the media title based on the available network bandwidth. After selecting a chunk of an encoded video, the client device requests the chunk of the encoded video from a server device that is included in a CDN. Upon receiving the chunk of the encoded video, the endpoint application decodes the chunk and then optionally upscales the resulting decoded chunk to generate a corresponding chunk of reconstructed video having the same resolution as the client device display. To affect the playback of the media title on the client device, the endpoint application plays back the different chunks of reconstructed video.

As described previously herein, most video encoding pipelines eliminate information from a source video to generate corresponding encoded videos. As a result, the visual quality of a reconstructed video is usually lower than the visual quality of the corresponding source video. In one conventional approach to improving the overall visual quality of reconstructed videos, machine learning techniques are used to generate conventional trained downscalers. Each conventional trained downscaler is normally associated with a different fixed scale factor and is trained to reduce end-to-end reconstruction errors when implemented in conjunction with a general-purpose upscaler.

One drawback of the above conventional technique is that client devices typically implement general-purpose upscalers that are not optimized to reduce reconstruction errors when used in conjunction with any conventional trained downscaler. As a result, for a given bitrate, the visual quality of a reconstructed video generated using a conventional trained downscaler in conjunction with a general-purpose upscaler can be sub-optimally low. Conversely, in these types of implementations, the total number of bits used to encode a source video to achieve a given target visual quality level for an associated reconstructed video can be unnecessarily high.

Another drawback of the above technique is that some of the client devices included in a typical video streaming system usually implement upscalers that lack interoperability with the conventional trained downscalers. If an upscaler lacks interoperability with a trained downscaler, then the upscaler can inadvertently insert artifacts (such as "halo effects" that result in "flickering" during playback) into a corresponding reconstructed video, thereby reducing the overall visual quality of the reconstructed video.

With the disclosed techniques, however, a training application jointly trains a downscaling convolutional neural network (CNN) and an upscaling CNN to reduce reconstruction errors when used together and when the downscaling CNN is used with another "training" upscaler. The training upscaler can be a general-purpose scaler or a previously trained scaler that does not change while the training application trains the downscaling CNN and the upscaling CNN.

In some embodiments, the training application generates a downscaling CNN that downscales images by a specified scale factor, generates an upscaling CNN that upscales images by the specified scale factor. Both the downscaling CNN and the upscaling CNN include values for learnable parameters or "learnable parameter values." The training application then generates a training network that includes the downscaling CNN, the upscaling CNN, and an instance of the training upscaler that upscales images by the specified scale factor. The downscaling CNN maps a portion of an image known as an "image patch" that is the input of the training network to a downscaled patch. Concurrently, the downscaling CNN and the training upscaler map the downscaled patch to two different reconstructed patches that are the outputs of the training network. Accordingly, the reconstructed patches are both derived from the same downscaled patch.

The training application executes an iterative, end-to-end training process on the training network based on image patches extracted from training images. During each iteration, the training application selects one or more image patches. The training application inputs each selected image patch into the training network to generate two reconstructed patches that are approximate reconstructions of the selected image patch. For each selected image patch, the training application sets a first loss equal to a Euclidean distance between the reconstructed patch generated by the upscaling CNN and the selected image patch. The training application sets a second loss equal to the Euclidean distance between the reconstructed patch generated by the training upscaler and the selected image patch. The training application sets an iteration loss equal to the sum of the first losses and weighted second losses for the selected image patches. Each weighted second loss is equal to the product of a weight and a second loss. The weight reflects the importance of the training upscaler relative to a fully trained version of the upscaling CNN.

To complete each iteration, the training application updates any number of the learnable parameters included in the upscaling CNN and any number of the learnable parameters included in the downscaling CNN to reduce the associated iteration loss. The training application continues to execute iterations using the most recent downscaling CNN and upscaling CNN until the training application determines that both the downscaling CNN and the upscaling CNN are fully trained. After the training application determines that both the downscaling CNN and the upscaling CNN are fully trained, the training application stores the downscaling CNN and the upscaling CNN as a trained downscaling CNN and a trained upscaling CNN, respectively. The training application transmits the trained downscaling CNN to a backend application. The training application also transmits the trained upscaling CNN to any number of client devices for later use by endpoint applications.

The backend application executes the trained downscaling CNN on the frames of a source video associated with a media title to generate frames of a downscaled video. The backend application also generates and attaches scaler ID metadata to the downscaled video. The scaler ID metadata enables the endpoint application to identify that the trained downscaling CNN was used to generate the downscaled video, the trained upscaling CNN is the most suitable upscaler for the downscaled video, and the training upscaler is the next most suitable upscaler for the downscaled video. The backend application executes an encoder on the downscaled video to generate an encoded video and attaches the scaler ID metadata to the encoded video. The backend application transmits the encoded video and the associated scaler ID metadata to a CDN for later access by client devices. Upon receiving a request for a chunk of the encoded video from an endpoint application executing on a client device, a server device included in the CDN transmits a bitstream to the client device. The bitstream includes the chunk of the encoded video and the scaler ID metadata associated with the encoded video.

Upon receiving the bitstream that includes the chunk of the encoded video and the scaler ID metadata, the endpoint application executes a decoder on the chunk of the encoded video to generate a chunk of downscaled video that is commonly referred to as a chunk of decoded video. The endpoint application selects an upscaler based on the scaler ID metadata. More specifically, if the trained upscaling CNN is available to the endpoint application, then the endpoint application selects the trained upscaling CNN. Otherwise, if the training upscaler or an upscaler that has the same type as the training upscaler can access the training upscaler then the endpoint application selects the training upscaler. As used herein, if an upscaler shares the same "type" as the training upscaler, then the upscaler is well-represented by the training upscaler. Some examples of types of training upscalers include nearest neighbour, bi-cubic, bi-linear and lanczos. Otherwise, the endpoint application can select any upscaler. The endpoint application uses the selected upscaler to upscale the chunk of decoded video to generate a corresponding chunk of a reconstructed video. The endpoint application then plays back the chunk of the reconstructed video.

At least one technical advantage of the disclosed techniques relative to the prior art is that a trained downscaling CNN and a corresponding trained upscaling CNN can be used by a backend application and an endpoint application, respectively, to more effectively limit the number of artifacts in reconstructed videos when performing scaling operations. Unlike prior art techniques, the trained downscaling CNN and the corresponding trained upscaling CNN are jointly trained to cooperatively reduce reconstruction errors attributable to scaling operations. Further, with the disclosed techniques, the endpoint application can identify, via metadata, the trained downscaling CNN used to generate an encoded video. Another technical advantage of the disclosed techniques is that a trained downscaling CNN can be trained to reduce reconstruction errors oftentimes associated with performing upscaling operation using trained downscaling CNNs in combination with different types of training upscalers. Thus, with the disclosed techniques, the visual quality of reconstructed videos can be increased across a wide range of different client devices. These technical advantages provide one or more technological improvements over prior art approaches.

System Overview

FIG. 1 is a conceptual illustration of a system 100 configured to implement one or more aspects of the various embodiments. For explanatory purposes, multiple instances or versions of like objects are denoted with reference numbers identifying the object and parenthetical alphanumeric character(s) identifying the instance or version where needed. As shown, in some embodiments, the system 100 includes, without limitation, a compute instance 110(1), a compute instance 110(2), a client device 190(1), a client device 190(2), and a CDN 180.

In some other embodiments, the system 100 can omit the compute instance 110(1), the compute instance 110(2), the client device 190(1), the client device 190(2), the CDN 180, or any combination thereof. In the same or other embodiments, the system 100 can include, without limitation, one or more other compute instances, one or more other client devices, one or more other CDNs, or any combination thereof. The components of the system 100 can be distributed across any number of shared geographic locations and/or any number of different geographic locations and/or implemented in one or more cloud computing environments (i.e., encapsulated shared resources, software, data, etc.) in any combination.

As shown, the compute instance 110(1) includes, without limitation, a processor 112(1) and a memory 116(1), and the compute instance 110(2) includes, without limitation, a processor 112(2) and a memory 116(2). The compute instance 110(1) and the compute instance 110(2) are also referred to herein individually as "the compute instance 110" and collectively as "the compute instances 110." The processor 112(1) and the processor 112(2) are also referred to herein individually as "the processor 112" and collectively as "the processors 112." The memory 116(1) and the memory 116(2) are also referred to herein individually as "the memory 116" and collectively as "the memories 116." Each compute instance (including the compute instances 110) can be implemented in a cloud computing environment, implemented as part of any other distributed computing environment, or implemented in a stand-alone fashion.

The processor 112 can be any instruction execution system, apparatus, or device capable of executing instructions. For example, the processor 112 could comprise a central processing unit, a graphics processing unit, a controller, a micro-controller, a state machine, or any combination thereof. The memory 116 of the compute instance 110 stores content, such as software applications and data, for use by the processor 112 of the compute instance 110. The memory 116 can be one or more of a readily available memory, such as random-access memory, read only memory, floppy disk, hard disk, or any other form of digital storage, local or remote.

In some other embodiments, any number of compute instances can include any number of processors and any number of memories in any combination. In particular, the compute instance 110(1), the compute instance 110(2), any number of other compute instances, or any combination thereof can provide a multiprocessing environment in any technically feasible fashion.

In some embodiments, a storage (not shown) may supplement or replace the memory 116 of the compute instance 110. The storage may include any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing In general, each compute instance (including the compute instances 110) is configured to implement one or more software applications. For explanatory purposes only, each software application is described as residing in the memory 116 of a single compute instance and executing on the processor 112 of the same compute instance. However, in some embodiments, the functionality of each software application can be distributed across any number of other software applications that reside in the memories of any number of compute instances and execute on the processors of any number of compute instances in any combination. Further, the functionality of any number of software applications can be consolidated into a single software application.

In particular, in some embodiments, a backend application 150 that implements a video encoding pipeline resides in the memory 116(2) of the compute instance 110(2) and executes on the processor 112(2) of the compute instance 110(2). As shown, the backend application 150 generates an encoded video set 172 based on a source video 106 that is associated with a media title. The source video 106 includes, without limitation, any amount and/or types of video content. Some examples of video content include, without limitation, any portion (including all) of feature length films, episodes of television programs, and music videos, to name a few.

The encoded video set 172 includes, without limitation, any number of encoded videos associated with the media title. An encoded video is also referred to herein as an "encode." Each encoded video in the encoded video set 172 includes, without limitation, encoded video content that is derived from the video content included in the source video 106 based on a different encoding point (not shown). Each of the encoding points includes, without limitation, a resolution (not shown) and values for one or more encoding parameters (e.g., a quantization parameter). The resolution for a given encoding point specifies the resolution of the source video 106 or a lower resolution. The encoding parameter(s) typically allow a monotonic performance in terms of bitrate and level of quality when encoding video content.

To generate the encoded video set 172, the backend application 150 downscales the source video 106 to each of the lower resolutions specified in the encoding points to generate a different lower-resolution video (not shown) for each of the resolutions. As persons skilled in the art will recognize, downscaling the source video 106 to a given resolution involves downscaling each frame (not shown in FIG. 1) of the source video 106 to the given resolution. For each of the encoding points, the backend application 150 encodes the source video 106 or the lower-resolution video having the specified resolution based on the specified values(s) of the encoding parameter(s) to generate an encoded video corresponding to the encoding point.

In some embodiments, the CDN 180 stores any number of copies of the encoded video set 172 and any amount and/or types of other digital content in any number of servers that are located in any number of different geographic regions. In the same or other embodiments, the CDN 180 transmits digital content to the client device 190(1), the client device 190(2), and any number of other client devices (not shown) in response to client requests (not shown).

The client device 190(1) and the client device 190(2) are different client devices. A client device can be any type of device that is capable of executing software applications and displaying an image and/or any other type of visual content via a client device display, For example a client device could be, without limitation, a smart television, a game console, a desktop computer, a laptop, a smartphone, a tablet, etc. A client device display could be, without limitation, a liquid crystal display, a light-emitting diode display, a projection display, a plasma display panel, etc.

In some embodiments, to playback the media title associated with the source video 106 on a client device, an endpoint application executing on the client device selects one of the encoded videos in the encoded video set 172 based on the available network bandwidth of a connection between the client device and the CDN 180. The endpoint application 192 transmits a client request to the CDN 180 requesting that the CDN 180 stream at least a portion of the selected encoded video to the client device.

In response, the CDN 180 streams discrete portions referred to herein as "chunks" of the selected encoded video to the client device for playback. For explanatory purposes, chunks of source videos, chunks of encoded videos, chunks of decoded videos, and chunks of reconstructed videos are also referred to herein as "source chunks," "encoded chunks," "decoded chunks," and "reconstructed chunks," respectively.

Upon receiving each encoded video chunk, the instance of the endpoint application 192 decodes the encoded video chunk to generate a corresponding decoded video chunk. The instance of the endpoint application 192 performs any number (including none) and/or types of scaling operations (e.g., upscaling operations and/or downscaling operations) on the decoded video chunk to generate a reconstructed video chunk having the same resolution as an associated client device display. To affect the playback of the media title on the client device, the instance of the endpoint application plays back a sequence of reconstructed chunks corresponding to different chunks of the source video 106.

As described previously herein, the downscalers and encoders included in most video encoding pipelines eliminate information from a source video to generate corresponding encoded videos. As a result, the visual quality of a reconstructed video is usually lower than the visual quality of the corresponding source video. In one conventional approach to limiting the diminution in visual quality of reconstructed videos attributable to downscaling, machine learning techniques are used to generate conventional trained downscalers. Each conventional trained downscaler is normally associated with a different fixed scale factor and is trained to reduce end-to-end reconstruction errors when implemented in conjunction with a general-purpose upscaler.

One drawback of the above conventional technique is that client devices typically implement general-purpose upscalers that are not able to minimize the end-to-end loss of visual quality of a reconstructed video attributable to downscaling by a conventional trained downscaler. As a result, for a given bitrate, the visual quality of a reconstructed video generated using a conventional trained downscaler in conjunction with a general-purpose upscaler can be sub-optimally low. Conversely, in these types of implementations, the total number of bits used to encode a source video to achieve a given target visual quality level for an associated reconstructed video can be unnecessarily high.

Another drawback of the above technique is that some of the client devices included in a typical video streaming system usually implement upscalers that lack interoperability with the conventional trained downscalers. If an upscaler lacks interoperability with a trained downscaler, then the upscaler can inadvertently insert artifacts (such as "halo effects" that result in "flickering" during playback) into a corresponding reconstructed video, thereby reducing the overall visual quality of the reconstructed video.

Increasing the Visual Quality of Reconstructed Videos Across Different Types of Client Devices To address the above problems, the system 100 includes, without limitation, a training application 120 that uses machine learning techniques to generate a trained downscaling CNN 130 and a trained upscaling CNN 140 based on a scale factor 122, an upscaler 102, and training images 104. Both the trained downscaling CNN 130 and the trained upscaling CNN 140 are associated with the scale factor 122. As used herein, a downscaling CNN that is associated with a scale factor implements the scale factor to downscale any types of images. An upscaling CNN that is associated with a scale factor implements the scale factor to upscale any type of images.

The scale factor 122 can be any integer or any non-integer. The upscaler 102 can be any type of general-purpose upscaler, any type of trained upscaler that implements the scale factor 122, or any other implementation of any type of upscaling algorithm that implements the scale factor 122. The training images 104 can include any number and/or types of training images, where each training image can be any type of image (e.g., a frame of a source video).

As shown, in some embodiments, the training application 120 resides in the memory 116(1) of the compute instance 110(1) and executes on the processor 112(1) of the compute instance 110(1). During a configuration phase, the training application 120 generates a training network (not shown in FIG. 1) based on the scale factor 122 and the upscaler 102. The training network includes a downscaling CNN, an upscaling CNN, and an instance of the upscaler 102 that each implements the scale factor 122. The instance of the upscaler 102 included in the training network is also referred to herein as a "training upscaler." As used herein, a "training upscaler" can be any component that performs upscaling operations on a downscaled image during the training of a downscaling CNN but is not trained during the training of the downscaling CNN. For example, a training upscaler could be a general-purpose upscaler, any type of (previously) trained upscaler that implements any scale factor(s), or any other implementation of any type of upscaling algorithm.

The input to the training network is an image patch and the outputs of the training network are two different reconstructed versions of the input patch referred to herein as "reconstructed patches." As used herein an "image patch" can be any portion (including all) of any type of image. The training network generates one of the reconstructed patches using the downscaling CNN in conjunction with the upscaling CNN. The training network generates the other reconstructed patch using the downscaling CNN in conjunction with the training upscaler. Accordingly, the two reconstructed patches are both derived from a single downscaled image generated by the downscaling CNN, Importantly, each of the downscaling CNN and the upscaling CNN includes values for any number of learnable parameters (e.g., weights, biases). Values for learnable parameters are also referred to herein as "learnable parameter values." To initiate a training phase, the training application 120 partitions each of the training images 104 into one or image patches. During the training phase, the training application 120 executes end-to-end machine learning operations on the training network to iteratively and jointly update the learnable parameter values induced in the downscaling CNN 130 and the upscaling CNN 140 such that losses associated with the reconstructed patches are reduced. The losses correlate to end-to-end losses of visual quality between image patches and corresponding reconstructed patches. A loss associated with one or more reconstructed patches is also referred to herein as a "reconstruction error."

After the training application 120 finishes training the downscaling CNN and the upscaling CNN, the training application 120 stores the most recent versions of the downscaling CNN and the upscaling CNN as the trained downscaling CNN 130 and the trained upscaling CNN 140, respectively. The learnable parameter values included in the trained downscaling CNN 130 and the trained upscaling CNN 140 are also referred to herein as "learned parameter values." Advantageously, when used in combination with the trained upscaling CNN 140 or any type of upscaler that is well-represented by the training upscaler, the learned parameter values enable the trained downscaling CNN 130 to reduce losses in visual quality attributable to scaling.

As shown, the training application 120 transmits the trained downscaling CNN 130 to a backend application 150 included in the compute instance 110(2). As also shown, the training application 120 transmits the trained upscaling CNN 140 to an endpoint application 192(1) that is included in the client device 190(1). The endpoint application 192(1) is an instance of an endpoint application 192 (not explicitly shown). Although not shown, the training application 120 can transmit the trained upscaling CNN 140 to any number of other instances of the endpoint application 192 that are distributed across any number of other client devices.

Although not shown, any number of instances of the training application 120 can be configured to generate any number of other jointly trained CNN pairs associated with different scale factors. Each jointly-trained CNN pair includes a trained downscaling CNN that is associated with a scale factor and a "complementary' trained upscaling CNN that is associated with the same scale factor. Each jointly-trained CNN pair can be trained to reduce end-to-end reconstruction errors when the trained downscaling CNN is used in combination with the complementary trained upscaling CNN and any number and/or types of training upscalers. The training application 120, the training network, the trained downscaling CNN 130, and the trained upscaling CNN 140 are described in greater detail below in conjunction with FIG. 2.

As shown, the backend application 150 resides in the memory 116(2) of the compute instance 110(2) and executes on the processor 112(2) of the compute instance 110(2). The backend application 150 includes, without limitation, a downscaler set 160 and an encoder 170. As shown, the downscaler set 160 includes, without limitation, the trained downscaling CNN 130 and any number and/or types of other downscalers (indicated via ellipses). As used herein, a "downscaler" can be any component that performs downscaling operations on an image. For example, a downscaler could be a trained downscaling CNN that implements any scale factor, any other type of trained downscaler that implements any scale factor(s), a general-purpose downscaler, or any other implementation of any type of downscaling algorithm. In some embodiments, the downscaler set 160 includes multiple jointly trained CNN pairs associated with different scale factors.

As shown, the backend application 150 generates the encoded video set 172 associated with a media title and a scaler identifier (ID) metadata set 174 based on the source video 106 associated with the media title. As described previously herein, the encoded video set 172 includes one or more encoded videos associated with the media title. For each encoded video in the encoded video set 172, the scaler ID metadata set 174 optionally specifies any amount and/or type of scaler ID metadata. The scaler ID metadata associated with an encoded video enables instances of an endpoint application 192 (not explicitly shown) to identify a scale factor, a downscaler or a type of downscaler, a complementary upscaler or a type of upscaler, any other preferred upscalers or any other preferred types of upscalers, or any combination thereof in any technically feasible fashion.

Upon receiving the source video 106, the backend application 150 selects the scale factor 122 and zero or more other scale factors (not shown) based on the resolution of the source video 106 and the resolutions specified in any number of encoding points (not shown). For each scale factor, the backend application 150 selects and uses one or more of the downscalers included in the downscaler set 160 to generate a lower-resolution video corresponding to the scale factor and optionally any amount and/or type of scaler ID metadata associated with the selected downscaler.

For explanatory purposes, FIG. 1 depicts a downscaled video 162 and scaler ID metadata 184 that the backend application 150 generates using the downscaling CNN 130. More specifically, the backend application 150 executes the trained downscaling CNN 130 on the source video 106 to generate the downscaled video 162. The downscaled video 162 is a lower-resolution video corresponding to the scale factor 122. The backend application 150 also generates the scaler ID metadata 184 corresponding to the downscaled video 162. The scaler ID metadata 184 enables the endpoint application 192 to identify that the trained downscaling CNN 130 that implements the scale factor 122 was used to generate the downscaled video 162, the trained upscaling CNN 140 is the most suitable upscaler for upscaling the downscaled video 162, the training upscaler (e.g., the upscaler 102 configured to implement the scale factor 122) or an upscaler having the same type as the training upscaler is the next most suitable upscaler for downscaling the downscaled video 162, or any combination thereof.

More generally, in some embodiments, the scaler ID metadata associated with a fully trained downscaling CNN specifies at least one of the fully trained downscaling CNN, a fully trained upscaling CNN that was trained jointly with the fully trained downscaling CNN, a second upscaler that was used to train the fully trained downscaling CNN, or a type of the second upscaler.

For each of the encoding points, the backend application 150 executes the encoder 170 on the source video 106 or the lower-resolution video having the resolution specified in the encoding point based on the specified encoding parameter values(s) to generate an encoded video corresponding to the encoding point. Importantly, the backend application 150 and/or the encoder 170 propagates any scaler ID metadata associated with a downscaled video to each encoded video generated based on or "derived from" the downscaled video. Accordingly, the scaler ID metadata 184 is also associated with each encoded video that is generated based on the downscaled video 162.

As shown, the backend application 150 transmits the encoded video set 172 and the scaler ID metadata set 174 that is associated with the encoded video set 172 to the CDN 180. The CDN 180 streams encoded chunks of media titles to client devices in response to client requests received from instances of the endpoint application 192 executing the client devices. Importantly, if an encoded chunk is a chunk of an encoded video that is associated with scaler ID metadata, then the encoded chunk is associated with the same scaler ID metadata. When transmitting an encoded chunk that is associated with scaler ID metadata to a client device, the CDN 180 or an associated software application ensures that the scaler ID metadata associated with the encoded chunk is also transmitted to the client device. In some embodiments, the CDN 180 embeds the scaler ID metadata associated with an encoded chunk in a bitstream that transmits the encoded chunk. In some other embodiments, the CDN 180 transmits the scaler ID metadata associated with an encoded chunk to a client device prior to streaming the encoded chunk to the client device.

In some embodiments, to playback a portion of a media title, a client device executing the endpoint application 192 transmits a request for a corresponding encoded chunk to a server device (not shown) included in the CDN 180. In response to the request, the server device transmits the encoded chunk to the client device and ensures that the client device can access any scaler ID metadata associated with the encoded chunk. As noted above, in some embodiments, the server device transmits a bitstream that includes the encoded chunk and the associated scaler ID metadata to the client device.

When then client device executing the endpoint application 192 receives the encoded chunk, the endpoint application 192 executes a decoder 194 on the encoded chunk to generate a decoded chunk (not shown). The endpoint application 192 determines whether the encoded chunk and therefore the decoded chunk is associated with any scaler ID metadata. If the endpoint application 192 determines that the encoded chunk is associated with scaler ID metadata, then the endpoint application 192 accesses the scaler ID metadata to determine which upscaler should be used when upscaling the decoded chunk. More specifically, the endpoint application 192 and selects a "primary" upscaler from available upscalers based, at least in part, on the scaler ID metadata. As used herein, an "available upscaler" is an upscaler that is accessible to the endpoint application 192 for use in upscaling video content.

If the primary upscaler is a general-purpose upscaler, then the endpoint application 192 configures the upscaler to implement the same scale factor that is implemented by the trained downscaling CNN, The endpoint application 192 then causes the primary upscaler to upscale each frame (not shown in FIG. 1) of the decoded chunk to generate a reconstructed chunk that corresponds to the encoded chunk and is accessible for playback.

For explanatory purposes only, FIG. 1 depicts an encoded chunk 182 of an encoded video (not shown) generated based on the downscaled video 162 that the CDN 180 streams to both the client device 190(1) and the client device 190(2). Importantly, because the encoded chunk 182 is a chunk of an encoded video that is generated based on the downscaled video 162, the encoded chunk 182 is associated with the scaler ID metadata 184. When transmitting the encoded chunk 182 to a client device, the CDN 180 or an associated software application ensures that the scaler ID metadata 184 is also transmitted to the client device. In some embodiments, the CDN 180 embeds the scaler ID metadata 184 in a bitstream that transmits the encoded chunk 182. In some other embodiments, the CDN 180 transmits the scaler ID metadata 184 to a client device prior to streaming the encoded chunk 182 to the client device.

As shown, the client device 190(1) includes, without limitation, a compute instance 110(3) and a client device display 198(1). The endpoint application 192(1) is an instance of the endpoint application 192 that resides in a memory 116(3) of the compute instance 110(3) and executes on a processor 112(3) of the compute instance 110(3). As shown, the endpoint application 192(1) has access to (e.g., can execute) a decoder 194, the trained upscaling CNN 140, and an upscaler 108.

As shown, the endpoint application 192(1) executes the decoder 194 on the encoded chunk 182 to generate a decoded chunk (not shown). A decoded chunk is also referred to herein as a "downscaled chunk" and a "portion of a downscaled video." The endpoint application 192(2) determines that the trained upscaling CNN 140 is the most suitable upscaler for the decoded chunk based on the scaler ID metadata 184. Because the trained upscaling CNN 140 is available to the endpoint application 192(1), the endpoint application 192(2) selects the trained upscaling CNN 140 as the primary upscaler. As shown, the endpoint application 192(1) executes the trained upscaling CNN 140 on the decoded chunk to generate a reconstructed chunk 196(1). As the endpoint application 192(1) plays back the reconstructed chunk 196(1), the associated video content is displayed on the client device display 198(1).

As shown, the client device 190(2) includes, without limitation, a compute instance 110(4) and a client device display 198(2). The endpoint application 192(2) is an instance of the endpoint application 192 that resides in a memory 116(4) of the compute instance 110(4) and executes on a processor 112(4) of the compute instance 110(4). As shown, the endpoint application 192(2) has access to a decoder 194 and the upscaler 102, but does not have access to the trained upscaling CNN 140.

As shown, the endpoint application 192(2) executes the decoder 194 on the encoded chunk 182 to generate a decoded chunk (not shown). The endpoint application 192(2) determines that the upscaler 102 is the most suitable upscaler that is also available to the endpoint application 192(2) for upscaling the downscaled chunk based on the scaler ID metadata 184. Accordingly, the endpoint application 192(2) selects the upscaler 102 as the primary upscaler. As shown, the endpoint application 192(2) executes the upscaler 102 on the decoded chunk to generate a reconstructed chunk 196(2). As the endpoint application 192(2) plays back the reconstructed chunk 196(2), the associated video content is displayed on the client device display 198(2).

In general, as the suitability of an upscaler for an encoded chunk increases, the visual quality of a reconstructed chunk also increases. Accordingly, the visual quality of the reconstructed chunk 196(1) is higher than the visual quality of the reconstructed chunk 196(2). And as described in greater detail below in conjunction with FIG. 2, the training application 120 jointly trains the trained downscaling CNN 130 and the trained upscaling CNN 140 based on the scale factor 122 and the training images 104 while taking the upscaler 102 into consideration. Accordingly, the visual quality of the reconstructed chunk 196(2) can be higher than the visual quality of a reconstructed chunk generated via a conventional downscaler and a conventional upscaler.

Notably, the reconstruction errors used to optimize the trained downscaling CNN 130 and the trained upscaling CNN 140 approximate decreases in visual quality of frames of a reconstructed video attributable to reductions in the resolutions of corresponding frames of the source video 106. Consequently, generating the encoded video set 172 using the trained downscaling CNN 130 instead of a conventional downscaler in a video encoding pipeline can mitigate visual quality reductions typically experienced with conventional video encoding pipelines. Subsequently generating the reconstructed chunk 140(1) using the trained upscaling CNN 140 or, to a lesser extent, the upscaler 102 can further mitigate visual quality reductions typically experienced with conventional video encoding pipelines.

Note that the techniques described herein are illustrative rather than restrictive and may be altered without departing from the broader spirit and scope of the invention. Many modifications and variations on the functionality provided by the training application 120, the backend application 150, the endpoint application 192, the trained downscaling CNN 130, the trained upscaling CNN 140, and the upscaler 102 will be apparent to those of ordinary skill in the art without departing from the scope and spirit of the described embodiments.

It will be appreciated that the system 100 shown herein is illustrative and that variations and modifications are possible. For instance, the connection topology between the various components in FIG. 1 may be modified as desired. In some embodiments, the CDN 180 is supplemented with and/or replaced with one or more server devices, and the techniques described herein are modified accordingly. In particular, the backend application 150 transmits encoded videos and associated metadata and/or encoded video chunks and associated metadata to one or more server devices instead of or in addition to the CDN 180 for later access by one or more client devices.

Jointly Training a Downscaling CNN and an Upscaling CNN

FIG. 2 is a more detailed illustration of the training application 120 of FIG. 1, according to various embodiments. As described previously herein in conjunction with FIG. 1, the training application 120 generates the trained downscaling CNN 130 and the trained upscaling CNN 140 based on the upscaler 102, the scale factor 122, and the training images 104. The upscaler 102 can be any type of general-purpose upscaler, any type of trained upscaler that implements the scale factor 122, or any other implementation of any type of upscaling algorithm that can increase the resolution of images by the scale factor 122. The scale factor 122 can be any integer or any non-integer. The training images 104 include any number and/or types of images. For instance, the training images 104 can include any number of frames of each of any number and/or types of videos.

As shown, in some embodiments, the training application 120 includes, without limitation, a training network 220, a loss 270(1), a loss 270(2), and an update engine 290. During a configuration phase, the training application 120 generates a downscaling CNN 230, an upscaling CNN 240, and a training upscaler 250 that each implement the scale factor 122. The training application 120 then generates the training network 220 that includes, without limitation the downscaling CNN 230, the upscaling CNN 240, and the training upscaler 250.

The downscaling CNN 230 includes any number of learnable parameter values and maps a source image (not shown in FIG. 2) to a corresponding downscaled image having a resolution that is lower than the resolution of the source image by the scale factor 122. The source image can be any portion (including all) of any type of image. The training application 120 can generate the downscaling CNN 230 in any technically feasible fashion.

The upscaling CNN 240 includes any number of learnable parameter values and maps a downscaled image to a corresponding reconstructed image having a resolution that is higher than the resolution of the downscaled image by the scale factor 122. The training application 120 generates the upscaling CNN 240 having an architecture that is complementary to the architecture of the downscaling CNN 230.

In some embodiments, if the scale factor 122 is an integer, then the training application 120 generates the downscaling CNN 230 that includes a resolution decreasing stack that implements the scale factor 122 and is optionally preceded by a preliminary layer stack. Each of the optional preliminary layer stack and the resolution decreasing stack includes one or more learnable parameter values. The input of the preliminary layer stack is a source image and the output of the preliminary layer stack is a preliminary image having the same resolution as the source image. The input of the resolution decreasing stack is the preliminary image and the output of the resolution decreasing stack is a downscaled image having a resolution that is lower than the resolution of the preliminary image and therefore the source image by the scale factor 122.

In a complementary fashion, if the scale factor 122 is an integer, then the training application 120 generates the upscaling CNN 240 that includes a resolution increasing stack that implements the scale factor 122 and is optionally preceded by a preliminary layer stack. Each of the optional preliminary layer stack and the resolution increasing stack includes one or more learnable parameter values. The input of the preliminary layer stack is a downscaled image and the output of the preliminary layer stack is a preliminary image having the same resolution as the source image. The input of the resolution increasing stack is the preliminary image and the output of the resolution increasing stack is a reconstructed image having a resolution that is higher than the resolution of the preliminary image and therefore the downscaled image by the scale factor 122.

As persons skilled in the art will recognize, CNNs typically only allow pooling operations and stride operations based on integer factors and therefore performing resizing (e.g., downscaling or upscaling) of source images based on non-integer factors via a CNN can be problematic. In some embodiments, if the scale factor 122 is a non-integer, then the training application 120 sets a scale factor numerator and a scale factor denominator equal to a numerator and a denominator, respectively, of a fraction that expresses the scale factor 122 in lowest terms. The training application 120 then generates the downscaling CNN 230 that includes a resolution increasing stack that implements the scale factor numerator followed by a resolution decreasing stack that implements the scale factor denominator.

The input of the resolution increasing stack is the source image and the output of the resolution increasing stack is a preliminary image having a resolution that is higher than the resolution of the source image by the scale factor numerator. The input of the resolution decreasing stack is the preliminary image and the output of the resolution decreasing stack is a downscaled image having a resolution that is lower than the resolution of the preliminary image by the scale factor denominator. The resolution of the downscaled image is therefore lower than the resolution of the source image by the scale factor 122.

In a complementary fashion, if the scale factor 122 is a non-integer, then the training application 120 generates the upscaling CNN 240 that includes a resolution decreasing stack that implements the scale factor denominator followed by a resolution increasing stack that implements the scale factor numerator. The input of the preliminary layer stack is a downscaled image and the output of the preliminary layer stack is a preliminary image having a resolution that is lower than the resolution of the downscaled image by the scale factor denominator. The input of the resolution increasing stack is the preliminary image and the output of the resolution increasing stack is a reconstructed image having a resolution that is higher than the resolution of the preliminary image by the scale factor numerator. The resolution of the reconstructed image is therefore higher than the resolution of the downscaled image by the scale factor 122.

In some other embodiments, if the scale factor 122 is a non-integer, then the training application 120 omits the resolution increasing stack from the downscaling CNN 230 and implements custom resizing logic in the resolution decreasing stack to account for non-integer scaling. In a complementary fashion, the training application 120 omits the resolution decreasing stack from the upscaling CNN 240 and implements custom resizing logic in the resolution increasing stack to account for non-integer scaling.

Each preliminary layer stack can include any number and/or types of layers that collectively do not alter the scale of an input image. For instance, in some embodiments, the preliminary layer stack includes, sequentially, one or more convolution Rectified Linear Unit ("ReLU") layer pairs and a convolution layer. Each convolution ReLU layer pair includes a convolution layer followed by a ReLU layer.

Each resolution decreasing stack can include any number and/or types of layers that collectively downscale an input image by an associated factor. For instance, in some embodiments, the resolution decreasing stack includes, sequentially, a convolution layer with an input stride that is equal to the associated factor, one or more ReLU layer pairs, and a convolution layer.

Each resolution increasing stack can include any number and/or types of layers that collectively upscale an image by an associated factor. For instance, in some embodiments, the resolution increasing stack includes, sequentially, a deconvolution layer with an output stride that is equal to the associated factor, one or more ReLU layer pairs, and a convolution layer.

The training upscaler 250 is a version of the upscaler 102 that upscales by the scale factor 122. If the upscaler 102 is a general-purpose upscaler or any other type of upscaler that can be configured to implement different scale factors, then the training application 120 configures the upscaler 102 to implement the scale factor 122. The configured version of the upscaler 102 is referred to as the training upscaler 250. If, however, the upscaler 102 is a CNN or any other type of machine learning model that is trained to upscale by the scale factor 122 or any other type of upscaler that implements the scale factor 122, then the upscaler 102 is also referred to as the training upscaler 250.

As shown, the training application 120 connects the output of the downscaling CNN 230 to both the input of the upscaling CNN 240 and the input of the training upscaler 250 to generate the training network 220. For explanatory purposes, FIG. 2 depicts the training network 220 in the context of an exemplary forward pass of an image patch 210 through the training network 220. The image patch 210 can be any portion (including all) of any one of the training images 104. To initiate the exemplary forward pass, the training application 120 inputs the image patch 210 into the training network 220.

In response and during the exemplary training patch, the downscaling CNN 230 maps the image patch 210 to a downscaled patch 238 having a resolution that is lower than the resolution of the image patch 210 by the scale factor 122. The upscaling CNN 240 and the training upscaler 250 concurrently map the downscaled patch 238 to the reconstructed patch 248(1) and the reconstructed patch 248(2), respectively. The reconstructed patch 248(1) and the reconstructed patch 248(2) are different approximations of the image patch 210. Notably, the reconstructed patch 248(1) and the reconstructed patch 248(2) share a resolution that is higher than the resolution of the downscaled patch 238 by the scale factor 122 and therefore is equal to the resolution of the image patch 210.

For explanatory purposes, exemplary values for the scale factor 122 and exemplary resolutions for the image patch 210, the downscaled patch 238, the reconstructed patch 248(1), and the reconstructed patch 248(2) are depicted in italics. As shown, if the scale factor 122 is 2.0 and the resolution of the image patch 210 is 3840×2160, then the resolution of the downscaled patch 238 is 1920×1080, the resolution of the reconstructed patch 248(1) is 3840×2160, and the resolution of the reconstructed patch 248(2) is 3840×2160.

After completing the exemplary forward pass, the training application 120 uses a loss function denoted herein as L1 to compute the loss 270(1) based on the reconstructed patch 248(1) and the image patch 210. The loss 270(1) correlates to a decrease in the visual quality of the reconstructed patch 248(1) relative to the image patch 210 that is attributable to the scaling operations performed by the downscaling CNN 230 and the upscaling CNN 240. Similarly, the training application 120 uses a loss function denoted herein as L2 to compute the loss 270(2) based on the reconstructed patch 248(2) and the image patch 210. The loss 270(2) correlates to a decrease in the visual quality of the reconstructed patch 248(2) relative to the image patch 210 that is attributable to the scaling operations performed by the downscaling CNN 230 and the training upscaler 250.

More generally, the training application 120 partitions each of the training images 104 into multiple non-overlapping image patches to initiate a training phase. The training application 120 distributes the image patches evenly across M batch(es) (not shown), where M is a positive integer that is no greater than the number of image patches. Each batch includes N image patch(es), where N is a positive integer that is no greater than the number of image patches. For explanatory purposes, the nth image patch included in the $m^{th}$ batch is denoted herein as $I_{mn}$, where n can be any integer from 1 through N and m can be any integer from 1 through M.

During the training phase, the training application 120 incrementally and jointly trains the downscaling CNN 230 and the upscaling CNN 240 to reduce decreases in the visual quality of reconstructed patches derived from image patches over any number of epochs (not shown). The training application 120 can determine the total number of epochs in any technically feasible fashion. For instance, the training application 120 can determine the total number of epochs based on input received via a graphical user interface (not shown) and/or any number and/or types of convergence criteria. During each epoch, the training application 120 sequentially executes M iterations, where each iteration is associated with a different batch.

During an iteration associated with the $m^{th}$ batch, the training application 120 sequentially, concurrently, or in any combination thereof executes forward passes of the N image patches denoted $I_{m1}$-$I_{mN}$ through the training network 220. For explanatory purposes, a reconstructed patch generated by the downscaling CNN 230 and the upscaling CNN 240 based on $I_{mn}$ is denoted herein as $R1_{mn}$ and, more verbosely, as UpscalingCNN(DownscalingCNN($I_{mn}$). By contrast, a reconstructed patch generated by the downscaling CNN 230 and the training upscaler 250 based on $I_{mn}$ is denoted herein as $R2_{mn}$ and more verbosely, as TrainingUpscaler(DownscalingCNN($I_{mn}$).

After the training network 220 maps $I_{mn}$ to $R1_{mn}$, the training application 120 uses the loss function L1 to compute a loss denoted as L1($I_{mn}$) based on $R1_{mn}$ and $I_{mn}$. L1($I_{mn}$) correlates to a decrease in the visual quality of $R1_{mn}$ relative to $I_{mn}$ that is attributable to the scaling operations performed by the downscaling CNN 230 and the upscaling CNN 240. The training application 120 can implement any suitable loss function L1 in any technically feasible fashion to compute L1($I_{mn}$). In some embodiments, the training application 120 uses an L2 norm as the loss function L1 to compute L1($I_{mn}$) as follows:

$$L1(I_{mn}) = \|UpscalingCNN(DownscalingCNN(I_{mn}) - I_{mn}\|_2^2 \quad (1)$$

As persons skilled in the art will recognize, the L2 norm between two images is also commonly referred to as the "Euclidean distance" between the two images.

After the training network 220 maps $I_{mn}$ to $R2_{mn}$, the training application 120 uses the loss function L2 to compute a loss denoted as L2($I_{mn}$) based on $R2_{mn}$ and $I_{mn}$. L2($I_{mn}$) correlates to a decrease in the visual quality of $R2_{mn}$ relative to $I_{mn}$ that is attributable to the scaling operations performed by the downscaling CNN 230 and the training upscaler 250. The training application 120 can implement any suitable loss function L2 in any technically feasible fashion to compute L2($I_{mn}$). In some embodiments, the training application 120 uses an L2 norm as the loss function L2 to compute L2($I_{mn}$) as follows:

$$L2(I_{mn}) = \|TrainingUpscaler(DownscalingCNN(I_{mn}) - I_{mn}\|_2^2 \quad (2)$$

For the iteration associated with the $m^{th}$ batch, the update engine 290 computes an iteration loss (not shown) that is denoted herein as $L_m$ based on the losses L1($I_{m1}$)–L1($I_{m1}$) and L2($I_{m1}$)–L2($I_{m1}$). The training application 120 can implement any suitable iteration loss function in any technically feasible fashion to compute $L_m$. In some embodiments, the training application 120 uses a weighted sum as the iteration loss function to compute $L_m$ as follows:

$$L_m = \sum_{i=1}^{N} L1(I_{mn}) + \lambda L2(I_{mn}) \quad (3)$$

In equation (3), λ is a weight that correlates with the importance of the visual quality of reconstructed images generated using the trained upscaling CNN 140 relative to the importance of the visual quality of reconstructed images generated using upscalers that are well represented by the training upscaler.

As shown, to complete the iteration associated with the $m^{th}$ batch, the update engine 290 performs a parameter update 298 based on a goal of reducing the iteration loss $L_m$. During the parameter update 298, the update engine 290 jointly updates any number of the learnable parameter values included in the downscaling CNN 230 and any number of the learnable parameter values included in the upscaling CNN 240. Together, the new versions of the downscaling CNN 230 and the upscaling CNN 240 are better optimized for the goal of reducing the iteration loss $L_m$. After the first iteration, the downscaling CNN 230 and the upscaling CNN 240 are also referred to as a "partially trained" downscaling CNN and a "partially trained" upscaling CNN, respectively.

The update engine 290 can execute any number and/or types of machine learning operations to perform the parameter update 298. In some embodiments, the update engine 290 executes any number and/or types of backpropagation operations and any number and/or types of gradient descent operations on the training network 220 to perform the parameter update 298.

After the update engine 290 completes the parameter update 298 and therefore the iteration associated with the $m^{th}$ batch, the training application 120 determines whether the training process is complete. If the training application 120 determines that the training process is not complete, then the training application 120 executes a new iteration using the training network 220 that includes the most recent versions of the downscaling CNN 230 and the upscaling CNN 240.

After the training application 120 determines that the training process is complete, the most recent versions of the downscaling CNN 230 and the upscaling CNN 240 are also referred to as a "fully trained" downscaling CNN and a "fully trained" upscaling CNN, respectively. The training application 120 sets the trained downscaling CNN 130 and the trained upscaling CNN 140 equal to the fully trained downscaling CNN and the fully trained upscaling CNN, respectively.

The training application 120 stores the trained downscaling CNN 130 in a memory that is accessible to the backend application 150 and/or transmits the trained downscaling CNN 130 to the backend application 150. The training application 120 stores the trained upscaling CNN 140 in a memory that is accessible to any number of client applications and/or transmits the trained upscaling CNN 140 to any number of client applications.

As noted previously herein in conjunction with FIG. 1, the techniques described herein are illustrative rather than restrictive and may be altered without departing from the broader spirit and scope of the invention. Many modifications and variations on the functionality provided by the training application 120, the training network 220, the downscaling CNN 230, the upscaling CNN 240, the upscaler 102, the training upscaler 250, and the update engine 290 will be apparent to those of ordinary skill in the art without departing from the scope and spirit of the described embodiments.

In particular, in some other embodiments, the training application 120 the training application 120 jointly trains the trained downscaling CNN 130 and the trained upscaling CNN 140 based on the scale factor 122 and the training images 104 while taking zero or more training upscalers and zero or more training downscalers into consideration. Each training upscaler can be a general-purpose upscaler that is configured to implement the scale factor 122, a machine learning model that is trained to upscale by the scale factor 122, or any other implementation of any type of upscaling algorithm that implements the scale factor 122. Each training downscaler can be a general-purpose downscaler that is configured to implement the scale factor 122, a machine learning model that is trained to downscale by the scale factor 122, or any other implementation of any type of downscaling algorithm that implements the scale factor 122.

In some embodiments, the training application 120 can implement any number and/or types of loss functions that each take the downscaling CNN 230, the upscaling CNN 240, zero or more training upscalers, zero or more training downscalers, or any combination thereof into account in any technically feasible fashion. In particular the training application 120 can compute values for any types of metrics that correlate to absolute visual quality levels, visual quality changes, absolute distortion levels, distortion changes, or any combination thereof to compute any number and/or types of losses associated with reconstructed patches.

In some embodiments, to include an additional training upscaler in the training network 220, the training application 120 connects the output of the downscaling CNN 230 to the additional training upscaler. During a forward pass of an image patch $I_{mn}$ through the training network 220, the additional training upscaler generates an additional reconstructed patch that is an approximate reconstruction of $I_{mn}$. Subsequently, the training application 120 computes a loss that is associated with both the downscaling CNN 230 and the additional training upscaler.

In some embodiments, to include an additional training downscaler in the training network 220, the training application 120 connects the input of the training network 220 to the input of the additional training downscaler and connects the output of the additional training downscaler to the upscaling CNN 240. During a forward pass of an image patch $I_{mn}$ through the training network 220, the additional training upscaler upscales an image patch $I_{mn}$ to generate an additional downscaled patch. The additional downscaled patch is upscaled by the upscaling CNN 240 to generate an additional reconstructed image that is an approximate reconstruction of $I_{mn}$. The training application 120 computes a loss that is associated with both the additional training downscaler and the upscaling CNN 240.

In some embodiments, for each additional training scaler (e.g., an additional training upscaler or an additional training downscaler), the update engine 290 adds a corresponding weighted term to the iteration loss function. In some embodiments, the training application 120 computes $L_m$ for a training network 220 that includes the downscaling CNN 230, the upscaling CNN 240, the training upscaler 250, and an additional training scaler as follows:

$$L_m = \sum_{i=1}^{N} L1(l_{mn}) + \lambda L2(l_{mn}) + KL3(l_{mn}) \quad (4)$$

In equation (4), K is a weight for a loss function L3 that correlates with the visual quality of an additional reconstructed patch generated using the additional training scaler relative to a corresponding image patch.

In some embodiments, the training application 120 generates a training network that includes the downscaling CNN 230 and the upscaling CNN, but not the training upscaler 250. The training application 120 computes $L_m$ for a training network 220 that includes the downscaling CNN 230, the upscaling CNN 240, but not the training upscaler 250 as follows:

$$L_m = \sum_{i=1}^{N} L1(l_{mn}) \quad (5)$$

In some embodiments, the training application 120 can implement any types of loss functions (e.g., loss function L1 and loss function L2) based on any number and/or types of image distance metrics, visual quality metrics, visual quality models, or any combination thereof instead of or in addition to the Euclidean distance used in equations (1) and (2).

In another example, in some embodiments, the convolution layer with the input stride described above is replaced with a pooling layer that executes any type of pooling operation (e.g., a max pooling operation or an average pooling operation). In the same or other embodiments, the deconvolution layer with the output stride described above is replaced with deconvolution layer with an output stride that is not equal to one is replaced with an unpooling layer that executes any type of unpooling operation (e.g., a nearest neighbor unpooling operation or a max unpooling operation), FIG. 3 is a flow diagram of method steps for jointly training a downscaling CNN and an upscaling CNN, according to various embodiments. Although the method steps are described with reference to the systems of FIGS. 1 and 2, persons skilled in the art will understand that any system configured to implement the method steps, in any order, falls within the scope of the embodiments.

As shown, a method 300 begins at step 302, where the training application 120 generates the downscaling CNN 230 and the upscaling CNN 240 based on the scale factor 122. At step 304, the training application 120 generates the training network 220 that includes the downscaling CNN 230, the upscaling CNN 240, and zero or more training upscalers that implement the scale factor.

At step 306, the training application 120 extracts image patches from the training images 104, distributes the image patches across any number of batch(es), and selects the first batch. At step 308, for each image patch in the selected batch, the training application 120 executes the downscaling CNN 230 on the image patch to generate a corresponding downscaled patch. At step 310, for each image patch in the selected batch, the training application 120 independently executes the upscaling CNN 240 and each training upscaler on the corresponding downscaled patch to generate corresponding reconstructed patch(es).

At step 312, for each image patch in the selected batch, the training application 120 computes corresponding loss(es) based on the image patch and the corresponding reconstructed patch(es). At step 314, the update engine 290 included in the training application 120 computes the iteration loss based on the loss(es) corresponding to the image patch(es) in the selected batch and then updates learnable parameter values of both the upscaling CNN 240 and the downscaling CNN 230 based on the iteration loss.

At step 316, the training application 120 determines whether the selected batch is the last batch. If, at step 314, the training application 120 determines that the selected batch is not the last batch, then the method 300 proceeds to step 318. At step 318, the training application 120 selects the next batch, and the method 300 returns to step 308, where the training application 120 executes the downscaling CNN 230 on the image patch(es) in the newly selected batch to generate corresponding downscaled patch(es).

If, however, at step 316, the training application 120 determines that the selected batch is the last batch, then the method 300 proceeds directly to step 320. At step 320, the training application 120 determines whether the current epoch is the last epoch. If, at step 320, the training application 120 determines that the current epoch is not the last epoch, then the method 300 proceeds to step 322. At step 322, the training application 120 selects the first batch, and the method 300 returns to step 308, where the training application 120 executes the downscaling CNN 230 on the image patch(es) in the newly selected batch to generate corresponding downscaled patch(es).

If, however, at step 320, the training application 120 determines that current epoch is the last epoch, then the method 300 proceeds directly to step 324. At step 324, the training application 120 stores the downscaling CNN 230 as the trained downscaling CNN 130 associated with the scale factor 122, stores the upscaling CNN 240 as the trained downscaling CNN 130 associated with the scale factor 122, transmits the trained downscaling CNN 130 to the backend application 150, and transmits the trained upscaling CNN 140 to any number of endpoint applications 192. The method 300 then terminates.

Figure 4:
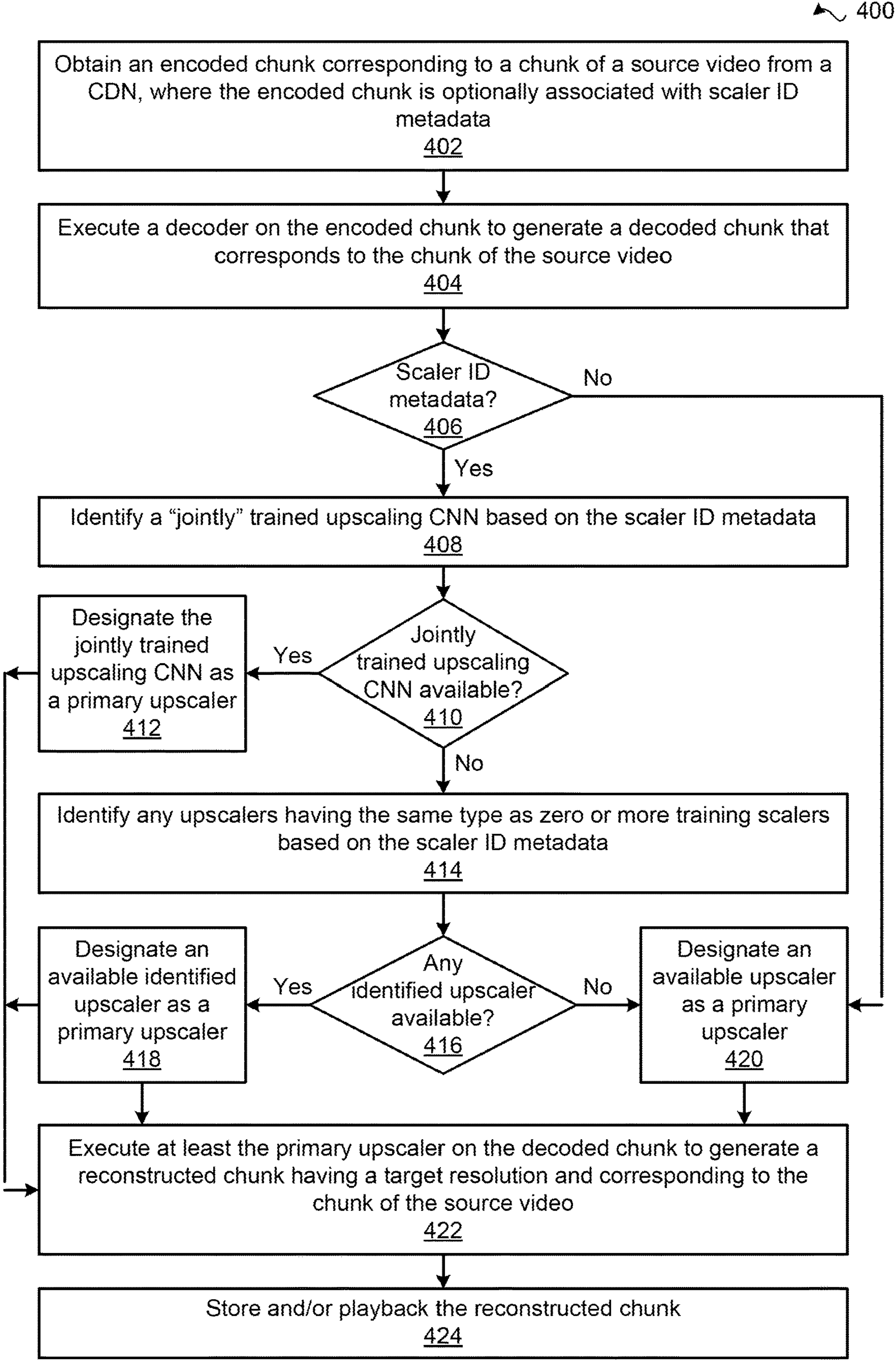
FIG. 4 is a flow diagram of method steps for generating a reconstructed chunk of a source video, according to various embodiments.

FIG. 4 is a flow diagram of method steps for generating a reconstructed chunk of a source video, according to various embodiments. Although the method steps are described with reference to the systems of FIGS. 1 and 2, persons skilled in the art will understand that any system configured to implement the method steps, in any order, falls within the scope of the embodiments.

As shown, a method 400 begins at step 402, where the endpoint application 192 obtains an encoded chunk corresponding to a chunk of a source video from the CDN 180. Notably, the encoded chunk is optionally associated with scaler ID metadata. At step 404, the endpoint application 192 executes a decoder on the encoded chunk to generate a decoded chunk that corresponds to the chunk of the source video.

At step 406, the endpoint application 192 determines whether the encoded chunk is associated with scaler ID metadata. If, at step 406, the endpoint application 192 determines that the encoded chunk is not associated with scaler ID metadata, then the method 400 proceeds directly to step 420. At step 420, the endpoint application 192 designates an available upscaler as a primary upscaler, and the method 400 proceeds directly to step 422.

If, however, at step 406, the endpoint application 192 determines that the encoded chunk is associated with scaler ID metadata, then the method 400 proceeds to step 408. At step 408, the endpoint application 192 identifies a "jointly" trained upscaling CNN based on the scaler ID metadata.

At step 410, the endpoint application 192 determines whether the jointly trained upscaling CNN is available. If, at step 410, the endpoint application 192 determines that the jointly trained upscaling CNN is available, then the method 400 proceeds to step 412. At step 412, the endpoint application 192 designates the jointly trained upscaling CNN as a primary upscaler, and the method 400 proceeds directly to step 422.

If, however, at step 410, the endpoint application 192 determines that the jointly trained upscaling CNN is not available, then the method 400 proceeds directly to step 414. At step 414, the endpoint application 192 identifies any upscalers having the same type as zero or more training scalers based on the scaler ID metadata.

At step 416, the endpoint application 192 determines whether any identified upscaler is available. If, at step 416, the endpoint application 192 determines that one or more training upscalers are available, then the method 400 proceeds to step 418. At step 418, the endpoint application 192 designates an available identified upscaler as a primary upscaler, and the method 400 proceeds directly to step 422.

If, however, at step 416, the endpoint application 192 determines that no training upscaler is available, then the method 400 proceeds directly to step 420. At step 420, the endpoint application 192 designates an available upscaler as a primary upscaler, and the method 400 proceeds directly to step 422.

At step 422, the endpoint application 192 executes at least the primary upscaler on the decoded chunk to generate a reconstructed chunk having a target resolution and corresponding to the chunk of the source video. At step 424, the endpoint application 192 stores and/or playbacks the reconstructed chunk. The method 400 then terminates.

In sum, the disclosed techniques can be used to mitigate an overall reduction in visual quality typically associated with scaling operations performed when streaming media titles. In some embodiments, a training application generates a training network that includes a downscaling CNN associated with a scale factor, an upscaling CNN associated with the same scale factor, and a training upscaler. The training application executes an end-to-end iterative training process on the training network based on image patches of training images.

During each forward pass of an iteration, the downscaling CNN downscales a different image patch by the scale factor to generate a downscaled patch. The upscaling CNN and the training upscaler independently upscale the downscaled patch by the scale factor to generate different reconstructed patches. The training application estimates a loss in quality for each reconstructed patch relative to the image patch. At the end of each iteration, the training application computes an iteration loss based on the losses in quality for the reconstructed patches. The training application then modifies learnable parameter values included in the downscaling CNN and the upscaling CNN in order to reduce the iteration loss.

After the training application determines that the iterative training process is complete, the training application stores the most recent versions of the downscaling CNN and the upscaling CNN as a trained downscaling CNN associated with the scale factor and a trained upscaling CNN associated with the scale factor, respectively, The training application transmits the trained downscaling CNN to a backend application. The training application transmits the trained upscaling CNN to endpoint applications that execute on one or more client devices.

The backend application executes the trained downscaling CNN on the frames of a source video associated with a media title to generate frames of a downscaled video having a resolution that is lower than the resolution of the source video by the scale factor associated with the trained downscaling CNN. The backend application attaches scaler ID metadata to the downscaled video. The scaler ID metadata enables the endpoint application to identify that the trained downscaling CNN for the scale factor was used to generate the downscaled video, the trained upscaling CNN is the most suitable upscaler for the downscaled video, and the training upscaler is the next most suitable upscaler for the downscaled video. The backend application executes an encoder on the downscaled video to generate an encoded video and attaches the scaler ID metadata to the encoded video.

In response to a request for a chunk of the encoded video, an instance of the endpoint application executing on a client device receives an encoded chunk and the scaler ID metadata. The endpoint application selects a primary upscaler based on the scaler ID metadata. More specifically, if the endpoint application can access the trained upscaling CNN, then the endpoint application selects the trained upscaling CNN as the primary upscaler. Otherwise, if the endpoint application can access the training upscaler then the endpoint application selects the training upscaler as the primary upscaler. Otherwise, the endpoint application can select any upscaler as the primary upscaler. The endpoint application uses the primary upscaler to upscale the chunk of decoded video by the associated scale factor to generate a corresponding chunk of a reconstructed video.

At least one technical advantage of the disclosed techniques relative to the prior art is that a trained downscaling convolutional neural network (CNN) and a corresponding trained upscaling CNN can be implemented in combination with one another within a video encoding system to more effectively limit the diminution in visual quality of reconstructed videos when performing scaling operations. Unlike prior art techniques, the trained downscaling CNN and the corresponding trained upscaling CNN are jointly trained to cooperatively reduce reconstruction errors attributable to scaling operations. Further, with the disclosed techniques, an endpoint application can identify, via metadata, the trained downscaling CNN used to generate an encoded video. The endpoint application can then identify and use the corresponding trained upscaling CNN to generate a corresponding reconstructed video that has an increased visual quality level for a given bitrate relative to what can typically be achieved using prior art techniques. Conversely, the disclosed techniques enable the number of bits used when encoding a source video to achieve a given target visual quality to be reduced relative to what is typically required using prior art techniques. Another technical advantage of the disclosed techniques is that a trained downscaling CNN can be trained to reduce reconstruction errors oftentimes associated with performing upscaling operation using trained downscaling CNNs in combination with different types of upscalers. Thus, with the disclosed techniques, interoperability between trained downscaling CNNs and different types of upscalers can be increased relative to prior art techniques, which allows the visual quality of reconstructed videos to be increased across a wide range of different client devices. These technical advantages provide one or more technological improvements over prior art approaches.

1. In some embodiments, a computer-implemented method for training convolutional neural networks (CNNs) to reduce reconstruction errors comprises executing a first CNN on a first source image having a first resolution to generate a first downscaled image having a second resolution; executing a second CNN on the first downscaled image to generate a first reconstructed image having the first resolution; computing a first reconstruction error based on the first reconstructed image and the first source image; updating a first learnable parameter value included in the first CNN based on the first reconstruction error to generate at least a partially trained downscaling CNN; and updating a second learnable parameter value included in the second CNN based on the first reconstruction error to generate at least a partially trained upscaling CNN.

2. The computer-implemented method of clause 1, wherein the first reconstruction error correlates to a decrease in visual quality of the first reconstructed image relative to the first source image.

3. The computer-implemented method of clauses 1 or 2, wherein computing the first reconstruction error comprises computing a weighted sum of a first Euclidean distance between the first reconstructed image and the first source image and a second Euclidean distance between a second reconstructed image and the first source image.

4. The computer-implemented method of any of clauses 1-3, further comprising executing a first general-purpose upscaler on the first downscaled image to generate the second reconstructed image.

5. The computer-implemented method of any of clauses 1-4, wherein updating the first learnable parameter value comprises performing at least one of a back-propagation operation or a gradient descent operation on a training network that includes the first CNN and the second CNN.

6. The computer-implemented method of any of clauses 1-5, further comprising generating the first CNN and the second CNN based on a first non-integer scale factor.

7. The computer-implemented method of any of clauses 1-6, further comprising executing a fully trained downscaling CNN on a first source video to generate a first downscaled video; and encoding the first downscaled video to generate a first encoded video.

8. The computer-implemented method of any of clauses 1-7, further comprising transmitting the first encoded video to at least one of a server device or a content delivery network for later access by a client device.

9. The computer-implemented method of any of clauses 1-8, further comprising generating first metadata that is associated with a fully trained downscaling CNN and specifies at least one of the fully trained downscaling CNN, a fully trained upscaling CNN that was trained jointly with the fully trained downscaling CNN, a training upscaler that was used to train the fully trained downscaling CNN, or a type of the training upscaler.

10. The computer-implemented method of any of clauses 1-9, further comprising transmitting the first metadata to at least one of a server device or a content delivery network for later access by a client device.

11. In some embodiments, one or more non-transitory computer readable media include instructions that, when executed by one or more processors, cause the one or more processors to train convolutional neural networks (CNNs) to reduce reconstruction errors by performing the steps of executing a first CNN on a first source image having a first resolution to generate a first downscaled image having a second resolution; executing a second CNN on the first downscaled image to generate a first reconstructed image having the first resolution; computing a first reconstruction error based on the first reconstructed image and the first source image; updating a first learnable parameter value included in the first CNN based on the first reconstruction error to generate at least a partially trained downscaling CNN; and updating a second learnable parameter value included in the second CNN based on the first reconstruction error to generate at least a partially trained upscaling CNN.

12. The one or more non-transitory computer readable media of clause 11, wherein the first reconstruction error comprises a Euclidean distance between the first reconstructed image and the first source image.

13. The one or more non-transitory computer readable media of clauses 11 or 12, where the first reconstruction error is computed further based on a second reconstructed image that is derived from the first downscaled image and has the first resolution.

14. The one or more non-transitory computer readable media of any of clauses 11-13 further comprising executing a trained upscaler on the first downscaled image to generate the second reconstructed image.

15. The one or more non-transitory computer readable media of any of clauses 11-14, wherein updating the second learnable parameter value comprises performing at least one of a backpropagation operation or a gradient descent operation on a training network that includes the first CNN and the second CNN.

16. The one or more non-transitory computer readable media of any of clauses 11-15, wherein the first CNN and the second CNN are associated with the same non-integer scale factor.

17. The one or more non-transitory computer readable media of any of clauses 11-16, further comprising executing a fully trained downscaling CNN on a first source video to generate a first downscaled video; and encoding the first downscaled video to generate a first encoded video.

18. The one or more non-transitory computer readable media of any of clauses 11-17, further comprising generating first metadata that is associated with a fully trained downscaling CNN and specifies at least one of the fully trained downscaling CNN, a fully trained upscaling CNN that was trained jointly with the fully trained downscaling CNN, a training upscaler that was used to train the fully trained downscaling CNN, or a type of the training upscaler.

19. The one or more non-transitory computer readable media of any of clauses 11-18, wherein the first source image comprises at least a portion of a frame of a video.

20. In some embodiments, a system comprises one or more memories storing instructions and one or more processors coupled to the one or more memories that, when executing the instructions, perform the steps of executing a first convolutional neural network (CNN) on a first source image having a first resolution to generate a first downscaled image having a second resolution; executing a second CNN on the first downscaled image to generate a first reconstructed image having the first resolution; computing a first reconstruction error based on the first reconstructed image and the first source image; updating a first learnable parameter value included in the first CNN based on the first reconstruction error to generate at least a partially trained downscaling CNN; and updating a second learnable parameter value included in the second CNN based on the first reconstruction error to generate at least a partially trained upscaling CNN.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for training convolutional neural networks (CNNs) to reduce reconstruction errors, the method comprising:

executing a first CNN on a first source image having a first resolution to generate a first downscaled image having a second resolution;

executing a second CNN on the first downscaled image to generate a first reconstructed image having the first resolution;

computing a first loss based on the first reconstructed image and a second reconstructed image, wherein the second reconstructed image is different from the first reconstructed image, has the first resolution, and is generated by upscaling the first downscaled image using a third CNN;

updating a first learnable parameter value included in the first CNN based on the first loss to generate at least a partially trained downscaling CNN; and updating a second learnable parameter value included in the second CNN based on the first loss to generate at least a partially trained upscaling CNN.

2. The computer-implemented method of claim 1, wherein the first loss correlates to a decrease in visual quality of the first reconstructed image relative to the first source image.

3. The computer-implemented method of claim 1, wherein computing the first loss comprises computing a weighted sum of a first Euclidean distance between the first reconstructed image and the first source image and a second Euclidean distance between the second reconstructed image and the first source image.

4. The computer-implemented method of claim 3, further comprising executing the third CNN that comprises a first general-purpose upscaler on the first downscaled image to generate the second reconstructed image.

5. The computer-implemented method of claim 1, wherein updating the first learnable parameter value comprises performing at least one of a backpropagation operation or a gradient descent operation on a training network that includes the first CNN and the second CNN.

6. The computer-implemented method of claim 1, further comprising generating the first CNN and the second CNN based on a first non-integer scale factor.

7. The computer-implemented method of claim 1, further comprising:

executing a fully trained downscaling CNN on a first source video to generate a first downscaled video; and encoding the first downscaled video to generate a first encoded video.

8. The computer-implemented method of claim 7, further comprising transmitting the first encoded video to at least one of a server device or a content delivery network for later access by a client device.

9. The computer-implemented method of claim 1, further comprising generating first metadata that is associated with a fully trained downscaling CNN and specifies at least one of the fully trained downscaling CNN, a fully trained upscaling CNN that was trained jointly with the fully trained downscaling CNN, a training upscaler that was used to train the fully trained downscaling CNN, or a type of the training upscaler.

10. The computer-implemented method of claim 9, further comprising transmitting the first metadata to at least one of a server device or a content delivery network for later access by a client device.

11. The computer-implemented method of claim 1, wherein the first loss is computed based on applying a weighting factor to a Euclidean distance between the second reconstructed image and the first source image.

12. One or more non-transitory computer readable media including instructions that, when executed by one or more processors, cause the one or more processors to train convolutional neural networks (CNNs) to reduce reconstruction errors by performing the steps of:

executing a first CNN on a first source image having a first resolution to generate a first downscaled image having a second resolution;

executing a second CNN on the first downscaled image to generate a first reconstructed image having the first resolution;

computing a first loss based on the first reconstructed image and a second reconstructed image, wherein the second reconstructed image is different from the first reconstructed image, has the first resolution, and is generated by upscaling the first downscaled image using a third CNN;

updating a first learnable parameter value included in the first CNN based on the first loss to generate at least a partially trained downscaling CNN; and updating a second learnable parameter value included in the second CNN based on the first loss to generate at least a partially trained upscaling CNN.

13. The one or more non-transitory computer readable media of claim 12, wherein the first loss is computed based on a Euclidean distance between the second reconstructed image and the first source image.

14. The one or more non-transitory computer readable media of claim 12, further comprising executing the third CNN that comprises a trained upscaler on the first downscaled image to generate the second reconstructed image.

15. The one or more non-transitory computer readable media of claim 12, wherein updating the second learnable parameter value comprises performing at least one of a backpropagation operation or a gradient descent operation on a training network that includes the first CNN and the second CNN.

16. The one or more non-transitory computer readable media of claim 12, wherein the first CNN and the second CNN are associated with the same non-integer scale factor.

17. The one or more non-transitory computer readable media of claim 12, further comprising:

executing a fully trained downscaling CNN on a first source video to generate a first downscaled video; and encoding the first downscaled video to generate a first encoded video.

18. The one or more non-transitory computer readable media of claim 12, further comprising generating first metadata that is associated with a fully trained downscaling CNN and specifies at least one of the fully trained downscaling CNN, a fully trained upscaling CNN that was trained jointly with the fully trained downscaling CNN, a training upscaler that was used to train the fully trained downscaling CNN, or a type of the training upscaler.

19. The one or more non-transitory computer readable media of claim 12, wherein the first source image comprises at least a portion of a frame of a video.

20. A system comprising:

one or more memories storing instructions; and one or more processors coupled to the one or more memories that, when executing the instructions, perform the steps of:

executing a first convolutional neural network (CNN) on a first source image having a first resolution to generate a first downscaled image having a second resolution;

executing a second CNN on the first downscaled image to generate a first reconstructed image having the first resolution;

computing a first loss based on the first reconstructed image and a second reconstructed image, wherein the second reconstructed image is different from the first reconstructed image, has the first resolution, and is generated by upscaling the first downscaled source image using a third CNN;

updating a first learnable parameter value included in the first CNN based on the first loss to generate at least a partially trained downscaling CNN; and updating a second learnable parameter value included in the second CNN based on the first loss to generate at least a partially trained upscaling CNN.

* * * * *